United States Patent [19]

Lohn

[11] Patent Number: 4,584,871
[45] Date of Patent: Apr. 29, 1986

[54] DEVICE AND METHOD FOR TESTING DIFFERENTIAL PRESSURE MEASURING PASSAGEWAYS

[75] Inventor: Paul Lohn, Houston, Tex.

[73] Assignee: Control Specialties, Inc., Houston, Tex.

[21] Appl. No.: 751,662

[22] Filed: Jul. 2, 1985

[51] Int. Cl.[4] ............................................. G01M 3/26
[52] U.S. Cl. ............................................. 73/40; 73/46
[58] Field of Search ................... 73/46, 49.6, 49.8, 40

[56]  References Cited

U.S. PATENT DOCUMENTS

| | | | |
|---|---|---|---|
| 2,342,616 | 2/1944 | O'Brien | 73/46 |
| 2,507,124 | 5/1950 | Stillinger | 73/49.6 |
| 3,882,715 | 5/1975 | Slinger | 73/46 |
| 3,950,983 | 4/1976 | Slinger | 73/46 |
| 4,382,379 | 5/1983 | Kelly | 73/46 |

Primary Examiner—Jerry W. Myracle
Assistant Examiner—Joseph W. Roskos
Attorney, Agent, or Firm—James E. Bradley; Charles D. Gunter, Jr.

[57]  ABSTRACT

A device and method are shown for detecting leaks in the differential pressure measuring passageways of an orifice meter tube. A body having a threaded end region is inserted within the differential pressure measuring passageway to be tested. A stem is slidingly received within an internal bore provided in the body when the body is engaged within the passageway. The stem has an exposed end which extends externally from the body and an inner end which is insertable through the internal bore of the body and into the passageway to be tested. A packing cap seals the region of the internal bore adjacent the exposed end of the stem and a deformable seal located on the inner end of the stem is actuated by manipulating the stem exposed end to seal off the opening of the passageway into the orifice meter tube. A test port located on the body communicates with the internal bore of the body for connection of vacuum testing equipment to test the integrity of the passageway.

10 Claims, 4 Drawing Figures

DEVICE AND METHOD FOR TESTING DIFFERENTIAL PRESSURE MEASURING PASSAGEWAYS

BACKGROUND OF THE INVENTION

1. Field of the Invention

The present invention relates to orifice meter tubes of the type inserted into pipelines used for custody transfer of gaseous fluids and, specifically, to a device and method for testing the differential pressure measuring passageways of the orifice meter tube to determine the integrity of the passageways.

2. Description of the Prior Art

Metering tubes are commercially available for insertion into pipelines used for custody transfer of gaseous fluids. For instance, a "Flange Neck Superior Meter Tube" is available in 150 to 2,500 pound pressure ratings from Control Specialties, Inc., of Houston, Tex. Such metering tubes are typically provided with either a single or a dual-chamber, flange-neck type orifice fitting. The "orifice fitting" is the portion of the metering tube which holds the orifice plate. The dual chamber orifice fitting design allows orifice plates to be installed and removed conveniently in a pressurized line. The dual-chamber orifice fitting is composed of two independent compartments separated by a stainless steel slide valve. A shaft pinion assembly, included on the orifice fitting, allows the slide valve to be opened and closed for insertion and removal of the orifice plate.

The orifice plate is typically made of stainless steel and contains an orifice which is usually located in the center of the plate. When the plate is installed within the orifice fitting, it is aligned within the metering tube perpendicular to the flow of fluids therein. A differential pressure measuring passageway is provided in the metering tube on either side of the orifice plate so that the pressure drop across the orifice plate can be measured using conventional equipment known to those skilled in the art. By measuring the pressure drop across the plate, the fluid velocity can be calculated.

The differential pressure measuring passageway provided in the casting of the metering tube can have imperfections which result in leakage. This leakage can be caused by porosity in the casting, cracks in the walls of the passageway, and the like. Leakage in the differential pressure measuring passageway results in inaccuracies in the fluid velocity measurement.

The present invention has as its object the provision of a device and method for vacuum testing of the differential pressure measuring passageways of an orifice meter tube to insure the integrity of the passageways.

SUMMARY OF THE INVENTION

The device of the invention is used for detecting leaks in the differential pressure measuring passageways of an orifice meter tube of the type designed to be inserted into a pipeline used for custody transfer of gaseous fluids. The meter tube has an orifice fitting holding an orifice plate which is installed within the orifice fitting within the meter tube perpendicular to the flow of fluid therein. The differential pressure measuring passageways are located on either side of the orifice plate within the meter tube.

The device of the invention includes a body having an externally threaded end region which is adapted to be threadedly engaged within a mating internally threaded region of the differential pressure measuring passageway which is to be tested. The body has an internal bore therethrough into which an elongated stem is slidingly received. The elongated stem has an exposed end which extends externally from the body and an inner end insertable through the internal bore of the body at least partially the length of the differential pressure measuring passageway. A packing cap received on the end of the body through which the exposed end of the stem extends seals the internal bore of the body. A testing port located on the body communicates with the internal bore of the body for connection of testing equipment. Seal means located on the inner end of the elongated stem are actuably by manipulation of the elongate stem to seal off the opening of the differential pressure measuring passageway into the orifice fitting and form a sealed chamber between the packing cap and the stem inner end which communicates with the testing port for testing the integrity of the passageway.

Additional objects, features and advantages will be apparent in the written description which follows.

DETAILED DESCRIPTION OF THE INVENTION

Figure 1:
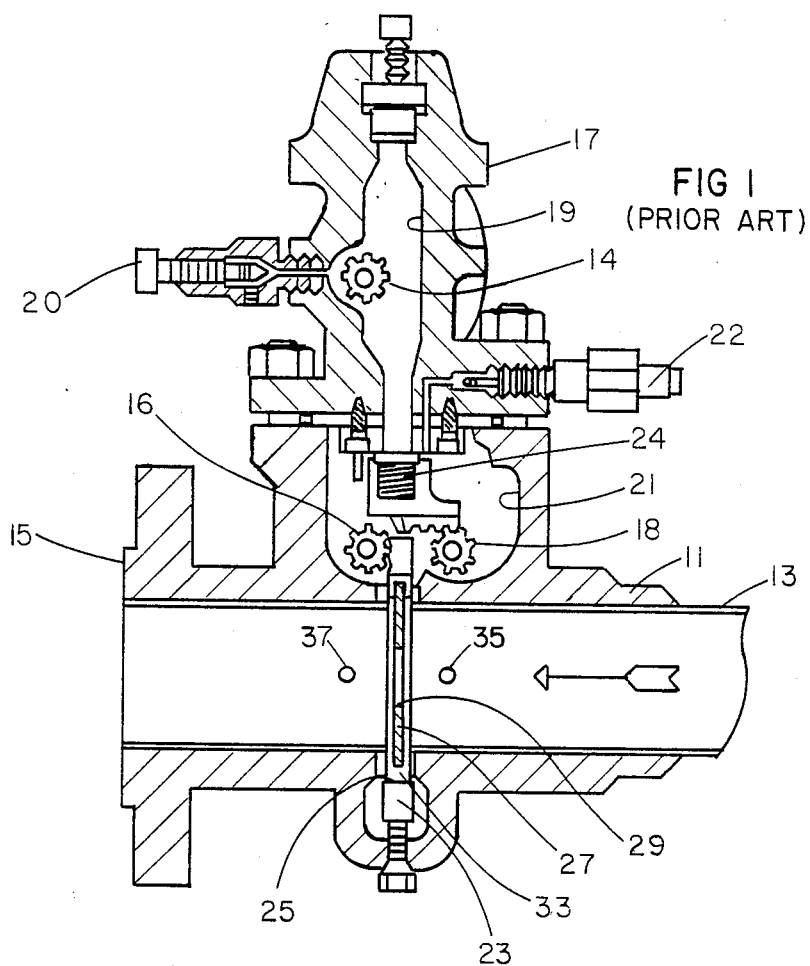
FIG. 1 is a partial side, cross-sectional view of the orifice fitting of a meter tube of the type which is tested by the device of the invention.

FIG. 1 shows a portion of an orifice meter tube, designated generally as 11, which is connected at either end 13, 15 thereof within a fluid transfer pipeline. The pipeline could be used, for instance, to transfer natural gas, carbon dioxide, ethylene, or the like. The meter tube 11 includes an orifice fitting 17 which can comprise an upper chamber 19 and a lower chamber 21 in the case of a dual chamber fitting. The orifice fitting 17 is designed to provide a convenient means for the insertion, removal and positioning of a plate carrier.

Figure 2:
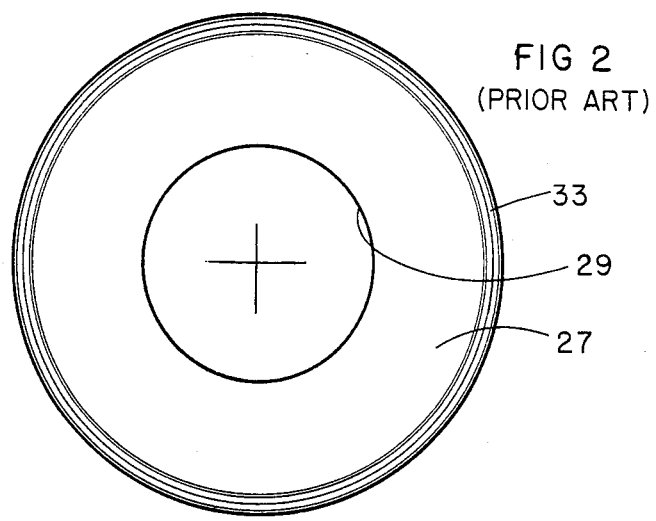
FIG. 2 is a side, perspective view of an orifice plate of the type used in the meter tube of FIG. 1.

The plate carrier 23 is a generally square, planar member and has a central opening 25 for receiving an orifice plate and seal (27, 33 respectively in FIG. 2). The orifice plate 27 is typically machined from stainless steel and has an outer diameter which can range from about 1" upwards to 45", depending upon the application. Typical plate thicknesses range from about $\frac{1}{8}$" to $\frac{3}{4}$". These dimensions can vary and are merely typical dimensions given for purposes of understanding the environment of the testing device of the invention. The orifice plate has an orifice 29 (FIG. 2) usually centrally located within the orifice plate 27. However, the orifice 29 can be eccentrically located and can be beveled, counterbored, and the like.

As shown in FIG. 1, the plate carrier 23 is inserted into the orifice fitting 17 through the upper chamber 19 and past a slide valve 24 into the lower chamber 21, whereby the plate carrier 23 and orifice plate 27 are arranged perpendicular to the flow of fluid passing through the tube 11. The plate carrier 23 is inserted by means of shaft pinion assemblies 14, 16, 18. Although certain other features of the orifice fitting 17 are shown for purposes of illustration, such as bleeder valves 20 and equalizer valve 22, these do not form a part of the present invention. Orifice fittings of the type shown are commercially available from Control Specialties, Inc., of Houston, Tex.

The orifice seal seals off the flow of fluid about the periphery of the orifice plate 27 so that fluid within the tube 11 is forced through the orifice 29. The resulting pressure drop which occurs across the orifice plate 27 can be measured by connecting commercially available equipment to the differential pressure measuring passageways 35, 37 located on either side of the orifice plate 27. By measuring the pressure drop across the orifice plate 27, the velocity of the fluid within the tube 11 can be calculated.

Figure 3:
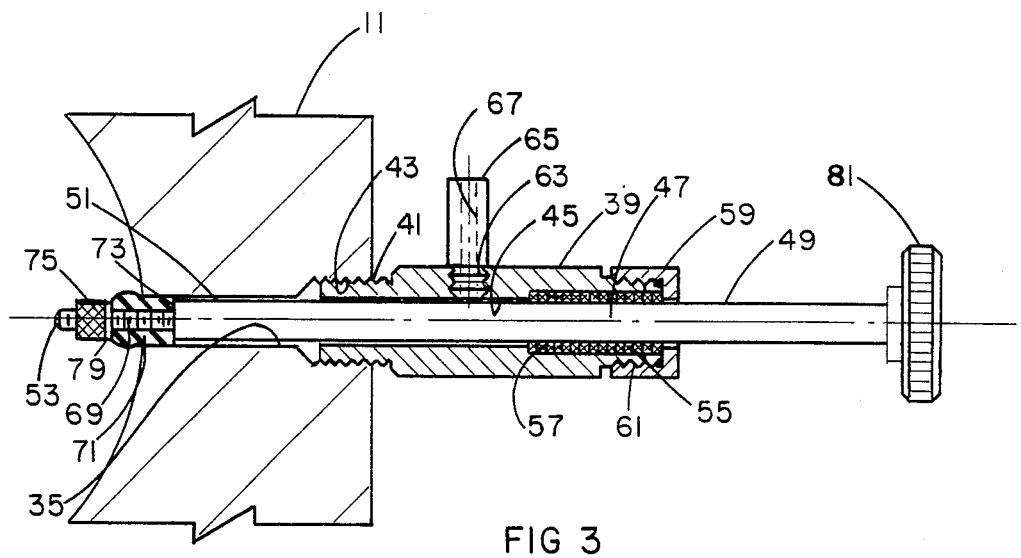
FIG. 3 is a side, cross-sectional view of the vacuum testing device of the invention.

FIG. 3 shows a device for detecting leaks in a differential pressure measuring passageway 35. The device includes a body 39 having an externally threaded end region 41 which is adapted to threadedly engage a mating internally threaded region 43 of the differential measuring passageway 35 which is to be tested.

The body 39 is generally cylindrically shaped and has an internal bore 45 therethrough. An elongate stem 47 is adapted to be slidingly received within the internal bore 45 of the body 39 when the body is engaged within the differential pressure measuring passageway 35. The elongate stem 47 is a cylindrical rod having an exposed end 49 which extends externally from the body 39 and an inner end 51 which is insertable through the internal bore 45 of the body 39 at least partially the length of the differential pressure measuring passageway 35. The inner end 51 is preferably slideable the entire length of the passageway 35 so that the innermost extent 53 is actually received within the bore of the meter tube 11.

Packing means, such as packing material 55 is received about the stem 49 in a counterbored region 57 in the interior of the body 39. A packing cap 59 threadedly engages external threads 61 of the body 39 so that the cap 59 can be screwed onto the body to compress the packing material 55 and insure a fluid seal about the stem 49. A testing port 63 is located on the body 39 external to the pressure measuring passageway 35 when the body is engaged within the passageway and communicates with the internal bore 45 of the body for connection of testing equipment. In FIG. 3, a plug 65 having a bore 67 is threadedly engaged within the testing port 63.

Figure 4:
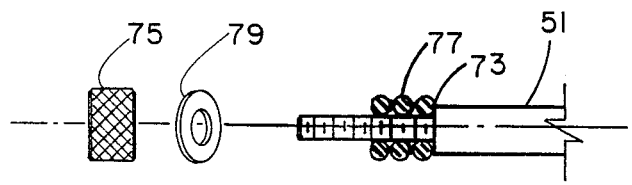
FIG. 4 is a partial, exploded view of another embodiment of the seal means of the testing device of FIG. 3.

The stem inner end 51 terminates in a threaded shaft 69 of lesser relative external diameter than the external diameter of the remaining stem 47. A seal means, such as deformable seal member 71 is received upon the threaded shaft between a fixed abutment, such as shoulder 73, and a movable abutment 75. As will be explained the movable abutment 75 is adjustable by manipulation of the stem exposed end 49 to compress the seal member 71 and seal off the differential pressure measuring passageway 35. The seal member 71 can comprise a sleeve of deformable elastomeric material, such as rubber. As shown in FIG. 4, the seal member can also be comprised of at least one O-ring 77 which is received between the shoulder 73 and the movable abutment, nut 75. A washer 79 is placed between the O-ring 77 and nut 75.

The method of detecting leaks of the invention will now be described. The body 39 is first installed within the threaded region 43 of the meter tube 11. The elongate stem 47 is then pushed inwardly within the body 39 so that the inner end 51 and seal member 71 are caused to slide along the passageway 35 in the direction of the opening into the bore of the meter tube 11. Since the length of the passageway 35 is known, the stem 47 can be graduated so that the operator knows when the seal member 71 has been extended within the opening into the bore of the metering tube.

At this point, the operator begins to manipulate the stem 47 by turning the knob 81 which causes the deformable seal member 71 to be rotated within the passageway 35. Because of the frictional engagement between the deformable seal 71 and the walls of the passageway 35, the nut 75 crawls up the threaded shaft 69 in the direction of the passageway 35 as the knob 81 is turned. This serves to actuate the deformable seal member 71 to seal off the opening of the differential pressure measuring passageway 35 into the meter tube 11 and creates a sealed chamber between the seal member 71, packing cap 59 and test port 63. Conventional vacuum testing equipment can then be connected to the test port 63 provided on the body 39 for testing the integrity of the passageway 35.

An invention has been provided with several advantages. The vacuum testing device of the invention is simple in design and economical to manufacture. The deformable seal member of the device is easily actuated to form a pressure tight seal with the passageway walls so that precise vacuum testing can be conducted to locate imperfections or faults within the differential pressure measuring passageways. The device can then be quickly and easily removed from the meter tube.

I claim:

1. A device for detecting leaks in the differential pressure measuring passageways of an orifice meter tube, the orifice meter tube being designed to be inserted into a pipeline used for custody transfer of gaseous fluids, the meter tube having an orifice fitting hooking an orifice plate which is installed within the orifice fitting within the meter tube perpendicular to the flow of fluid therein, the differential pressure measuring passageways being located on either side of the orifice plate within the meter tube, the leak detecting device comprising:

a body having an externally threaded end region which is adapted to threadedly engage a mating internally threaded region of the differential pressure measuring passageway which is to be tested, the body having an internal bore therethrough;

an elongated stem adapted to be slidingly received within the internal bore of the body when the body is engaged within the differential pressure measuring passageway, the elongate stem having an exposed end which extends externally from the body and an inner end insertable through the internal bore of the body at least partially the length of the differential pressure measuring passageway;

packing means for sealing the region of the internal bore adjacent the exposed end of the stem;

a testing port located on the body which communicates with the internal bore of the body for connection of testing equipment; and seal means located on the inner end of the elongate stem actuable by manipulation of the elongate stem to seal off the opening of the differential pressure measuring passageway into the orifice fitting for testing the integrity of the passageway.

2. A device for detecting leaks in the differential pressure measuring passageways of an orifice meter tube, the orifice meter tube being designed to be inserted into a pipeline used for custody transfer of gaseous fluids, the meter tube having an orifice fitting holding an orifice plate which is installed within the orifice fitting within the meter tube perpendicular to the flow of fluid therein, the differential pressure measuring passageways being located on either side of the orifice plate within the meter tube, the leak detecting device comprising:

a body having an externally threaded end region which is adapted to threadedly engage a mating internally threaded region of the differential pressure measuring passageway which is to be tested, the body having an internal bore therethrough;

an elongate stem adapted to be slidingly received within the internal bore of the body when the body is engaged within the differential pressure measuring passageway, the elongate stem having an exposed end which extends externally from the body and an inner end insertable through the internal bore of the body at least partially the length of the differential pressure measuring passageway;

a packing cap received on the end of the body through which the exposed end of the stem extends for sealing the internal bore of the body;

a testing port located on the body external to the pressure measuring passageway when the body is engaged within the passageway and communicating with the internal bore of the body for connection of testing equipment; and seal means located on the inner end of the elongate stem actuatable by manipulation of the elongate stem to seal off the opening of the differential pressure measuring passageway into the orifice fitting and form a sealed chamber between the packing cap and the stem inner end which communicates with the testing port for testing the integrity of the passageway.

3. The device of claim 2, wherein the stem inner end terminates in a threaded shaft and wherein the seal means comprises a deformable seal member which is received upon the threaded shaft between a fixed abutment and a movable abutment, the movable abutment being adjustable by manipulation of the stem exposed end to compress the seal member and seal off the differential pressure testing passageway.

4. The device of claim 3, wherein the movable abutment comprises a nut which is received upon the threaded shaft on one side of the seal member.

5. The device of claim 4, wherein the seal member is a sleeve of deformable elastomeric material.

6. The device of claim 4, wherein the seal member is comprised of at least one O-ring which is received about the threaded shaft between the nut and fixed abutment.

7. A method for detecting leaks in the differential pressure measuring passageways of an orifice meter tube, the orifice meter tube being designed to be inserted into a pipeline used for custody transfer of gaseous fluids, the meter tube having an orifice fitting holding an orifice plate which is installed within the orifice fitting within the meter tube perpendicular to the flow of fluid therein, the differential pressure measuring passageways being located on either side of the orifice plate within the meter tube the method comprising the steps of:

installing a body having an externally threaded end region into a mating internally threaded region provided in the differential pressure measuring passageway which is to be tested, the body having an internal bore therethrough;

providing an elongate stem within the internal bore of the body, the elongate stem having an exposed end which extends externally from the body and an inner end insertable through the internal bore of the body at least partially the length of the differential pressure measuring passageway;

providing the body with packing on the end of the body through which the exposed end of the stem extends for sealing the internal bore of the body;

manipulating the elongate stem to actuate seal means provided on the inner end of the stem to seal off the opening of the differential pressure measuring passageway into the orifice fitting; and connecting test equipment to a test port provided on the body external to the pressure measuring passageway which communicates with the internal bore of the body and, in turn, the passageway for testing the integrity of the passageway.

8. The method of claim 7, wherein the seal means is actuated by turning the exposed end of the elongate stem so that the inner end of the stem rotates within the differential pressure measuring passageway.

9. The method of claim 7, wherein the elongate stem is provided with a deformable annular seal member located on a threaded extent of the stem between a fixed shoulder on the stem and a nut which is threadedly engaged upon the threaded extent of the stem.

10. The method of claim 9, including the steps of sliding the elongate stem through the internal bore of the body into the differential pressure passageway with the deformable annular seal member frictionally engaging the walls of the passageway; and thereafter turning the posed end of the stem to rotate the seal member within the passageway whereby frictional engagement between the seal member and the passageway walls and between the seal member and the nut cause the nut to climb the threaded shaft in the direction of the fixed shoulder to compress the seal member and seal off the opening of the passageway into the orifice fitting.

* * * * *